United States Patent [19]

Breskin et al.

[11] Patent Number: 4,999,500

[45] Date of Patent: Mar. 12, 1991

[54] APPARATUS FOR RADIOGRAPHIC IMAGING

[75] Inventors: Amos Breskin, Rehovot; Rachel Chechik, Beit Hanan, both of Israel

[73] Assignee: Yeda Research & Development Co., Ltd., Rehovot, Israel

[21] Appl. No.: 429,291

[22] Filed: Oct. 31, 1989

[30] Foreign Application Priority Data

Nov. 7, 1988 [IL] Israel .................................... 88299

[51] Int. Cl.$^5$ ............................................ G01T 1/161
[52] U.S. Cl. ............................ 250/385.1; 250/363.02; 250/367; 250/389
[58] Field of Search ............. 382/28; 250/389, 363.02, 250/385.1, 367

[56] References Cited

U.S. PATENT DOCUMENTS 4,622,467 11/1986 Britten et al. ..................... 250/389

FOREIGN PATENT DOCUMENTS 1193617 5/1965 Fed. Rep. of Germany ... 250/385.1
55-080073 6/1980 Japan ............................... 250/385.1

OTHER PUBLICATIONS

Breskin et al., "A Highly Efficient Low-Pressure UV--Rich Detector with Optical Avalanche Recording", presented at the London Conference on Position Sensitive Detectors, London, 7-11 Sep. 1987, pp. 1-8.
Borkowski et al., "Proportional Counter Photon Camera", IEEE Trans. Nucl. Sci (USA), vol. NS19, No. 3, Jun. 72, pp. 161-168.
Sauvage et al., "A Systematic Study of the Emission of Light from Electron Avalanches in Low-Pressure TEA and TMAE Gas Mixtures", Nuclear Instruments and Methods in Physics Res. (1989), pp. 351-363.

Primary Examiner—Constantine Hannaher
Assistant Examiner—Jacob M. Eisenberg
Attorney, Agent, or Firm—Cushman, Darby & Cushman

[57] ABSTRACT

Apparatus for radiographic imaging including a multistage avalanche chamber receiving radiation from a multiplicity of radiation point sources on a sample and providing a multiple photon output indicative of the path of the emitted radiation through the avalanche chamber, image intensification apparatus receiving the photon output of the avalanche chamber, a camera receiving an output from the image intensification apparatus; image processing apparatus for receiving the camera output and carrying out a vector analysis on the information contained in the camera output in order to determine the location of the radiation emitting point source on the sample.

12 Claims, 12 Drawing Sheets

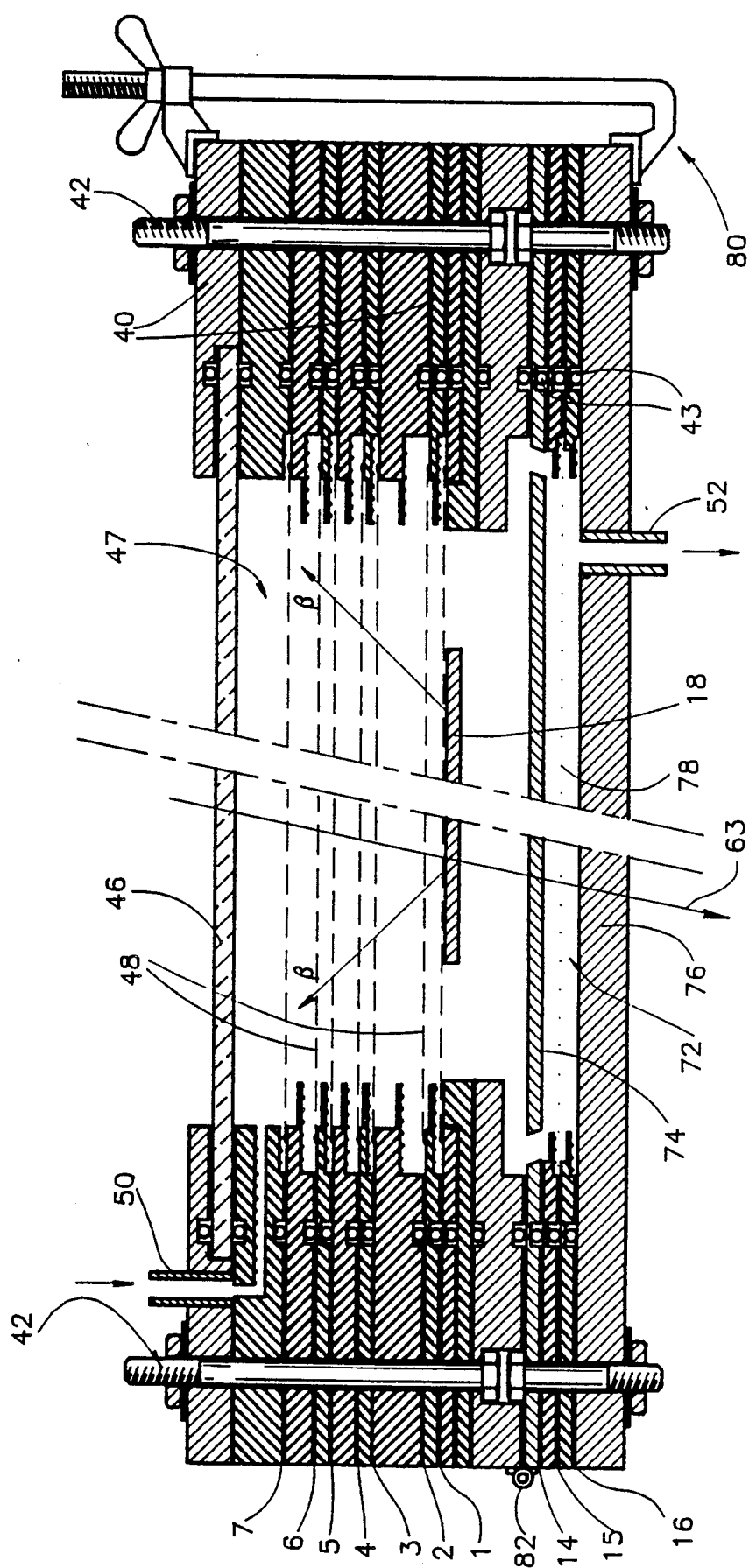

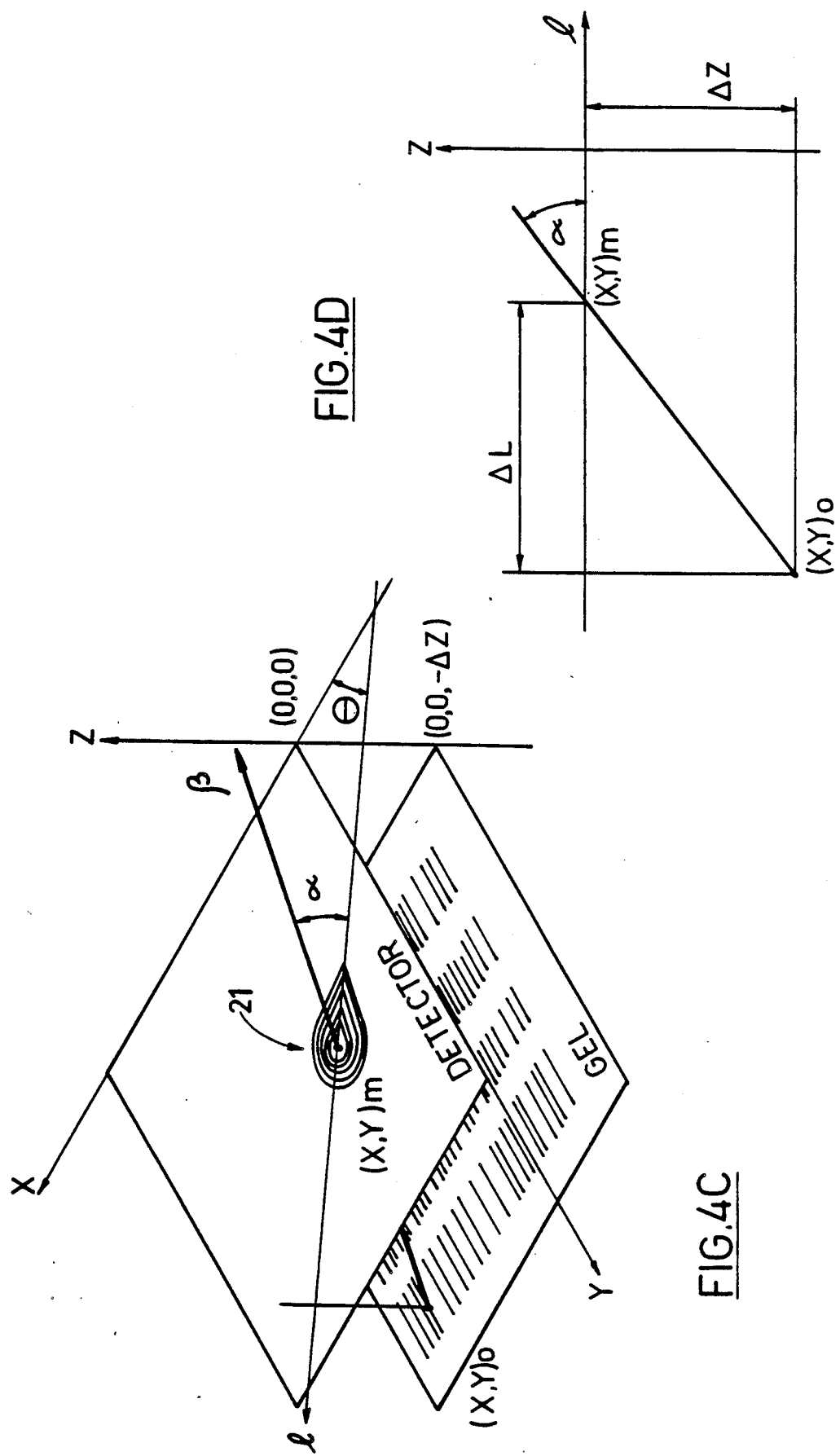

SH. 1 OF 2

SH. 2 OF 2

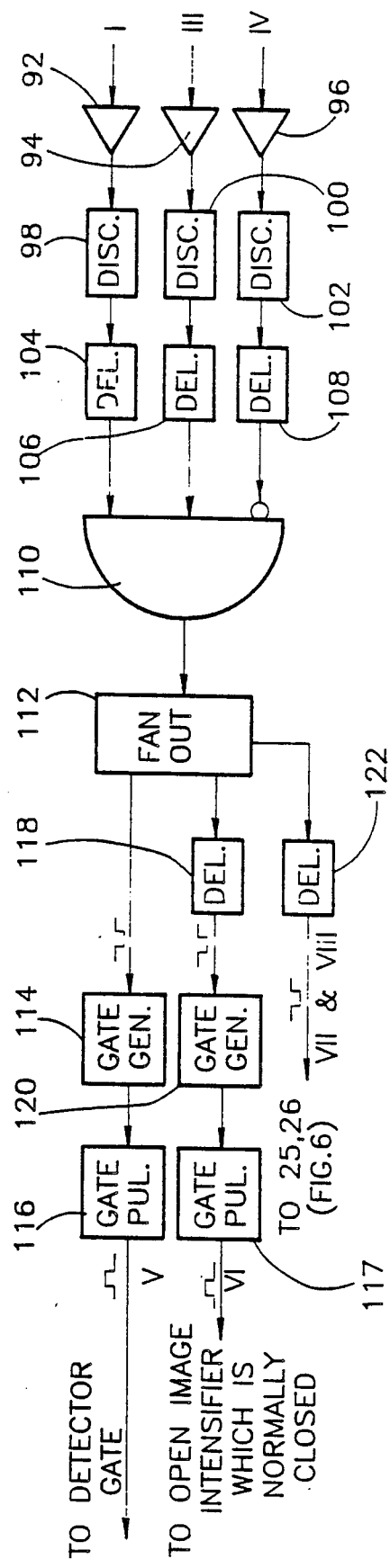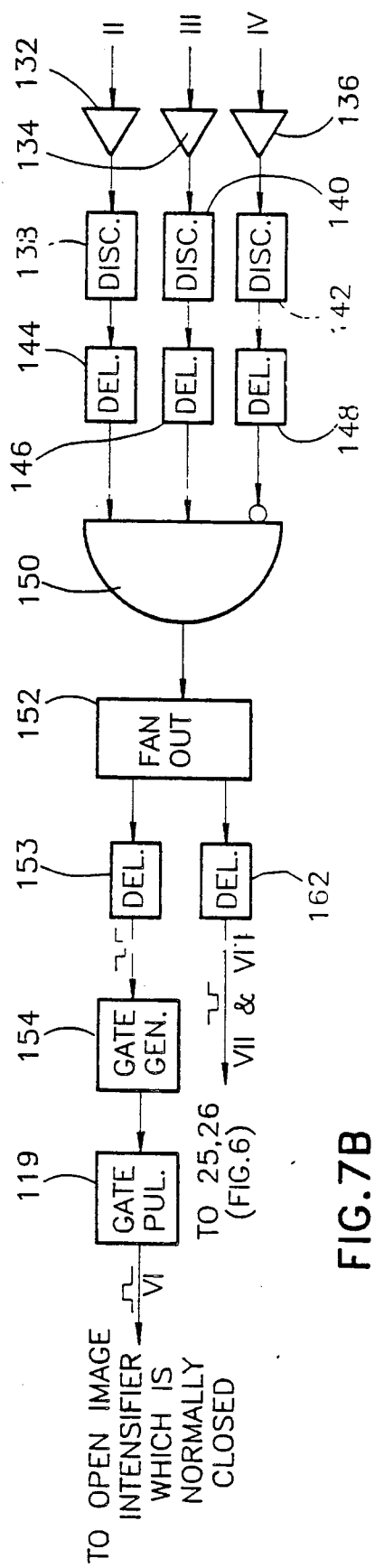

APPARATUS FOR RADIOGRAPHIC IMAGING

FIELD OF THE INVENTION

The present invention relates to biochemical and biological analysis generally and more particularly to automated reading and digitization of radiation emitter tagged images.

BACKGROUND OF THE INVENTION

There exist various chemical and biological analysis techniques which employ radiation emitter tagging. One such technique is gel electrophoresis which produces a radiation tagged image having a multiplicity of lines on a gel, each line representing a molecular component of given characteristics.

Increasingly, for the purpose of research and large scale diagnostics it is desired to quantify the results obtained, such that computer analyses and operations can be applied thereto.

One existing technique is to contact print from the gel onto radiation sensitive film. This technique is extremely slow, due to the relatively low radiation intensity involved and can require days in order to obtain a useful result, which must then be digitized by the use of a densitometer.

There are also known apparatus and techniques for automated blot analysis, such as that exemplified in the Betascope 603 Blot Analyzer which is available from Betagen Corporation of 100 Beaver Street, Waltham Mass. 02154, U.S.A. The resolution of the blot analyzer described above is relatively low, about 1-2 mm.

There is also known a radioanalytical imaging system which operates by scanning a sample with an ionization gas detector and provides resolution to at least 0.8 mm. Approximately eight hours are required to produce an image by such a technique. Such a system is commercially available from AMBIS Systems of San Diego, Calif. 92123, U.S.A.

Automatic techniques for analysis of non-radioactive electrophoretic gels are also known. Apparatus and software employing such ,a technique is available from Pharmacia LKB Biotechnology AB, of Uppsala, Sweden under the trademarks UltroScan XL and GelScan XL.

Various types of radiation detectors are known in the detection art. Examples of papers in this area are the following:

A Highly Efficient Low-Pressure UV-Rich Detector with Optical Avalanche Recording by A. Breskin, R. Chechik et al, presented at the London Conference on Position Sensitive Detectors 7-11 September, 1987 Nuclear Instruments and Methods in Physics Research A273 (1988) 798-804 (to be published in Nucl. Instrum. Methods);

A systematic study of the emission of light from electron avalanches in low pressure TEA and TMAE gas mixtures by D. Sauvage, A. Breskin and R. Chechik Submitted to Nuclear Instruments and Methods in Physics Research;

On the Optical Readout of Gas Avalanche Chambers and its Applications, by M. Suzuki, A. Breskin et al., Nuclear Instruments and Methods in Physics Research A263 (1988) 237-242;

Some Applications of the Imaging Proportional Chamber by G. Charpak, A. Breskin, R. Chechik et al, presented at the IEEE Nuclear Science Symposium, San Francisco, 21-23 October 1987, IEEE Transactions on Nuclear Science, NS-35, 483 (1988);

The Multistep Avalanche Chamber for Beta Radiochromatography by Ariella Cattai, Nuclear Instruments and Methods in Physics Research 215 (1983) page 489.

The Multistep Avalanche Chamber as a Detector in Radiochromatograpy Imaging, by G. Petersen et al, Nuclear Instruments and Methods 176 (1980) 239-244;

An Improved Multistep Avalanche Detector System for Digital Autoradiography, by J. E. Bateman, et al, Nuclear Instruments and Methods in Physics Research A264 (1988) 430-435;

A Beta Ray Imaging Device for Radiochromatography,by Hoan Nguyen Ngoc et al, Nuclear Instruments and Methods 173 (1980) 605-607; and Localization and Direct Quantitation of $^3$H-Labeled Proteins and RNAs in Slab Gels by a New Detection System, by Joachim Kruppa, Biochemical and Biophysical Research Communications, Vol. 113, No. 2, 1983, June 15, 1983, pp 703-709.

SUMMARY OF THE INVENTION

The present invention seeks to provide an improved apparatus and technique for high resolution automatic analysis of radioactive images which provides resolution which is superior to that obtained using prior art apparatus and techniques.

There is thus provided in accordance with a preferred embodiment of the present invention, apparatus for radiographic imaging including a multistage avalanche chamber receiving radiation from a multiplicity of radiation point sources on a sample and providing a multiple photon output indicative of the path of the emitted radiation through the avalanche chamber, image intensification apparatus receiving the photon output of the avalanche chamber, a camera receiving an output from the image intensification apparatus; image processing apparatus for receiving the camera output and carrying out a vector analysis on the information contained in the camera output in order to determine the location of the radiation emitting point source on the sample.

In accordance with a preferred embodiment of the invention, the camera comprises a CCD camera or any other suitable imaging device.

Additionally in accordance with a preferred embodiment of the invention, the avalanche chamber comprises a plurality of gas-filled regions separated from each other by wire grids and including a preamplification region, a gate region (optional), a charge amplification region, and a light amplification region.

Additionally in accordance with a preferred embodiment of the invention, the image processing apparatus includes frame grabber circuitry.

Further in accordance with a preferred embodiment of the invention, the avalanche chamber also includes a coincidence detector and apparatus for gating in response to the output thereof.

Additionally in accordance with a preferred embodiment of the invention, the avalanche chamber also includes an anticoincidence detector and apparatus for gating in response to the output thereof.

Further in accordance with a preferred embodiment of the invention, the anti-coincidence detector is associated with an optically transparent window.

Additionally in accordance with a preferred embodiment of the invention, the anti-coincidence detector is associated with an opaque window.

Additionally in accordance with a preferred embodiment of the invention, there is provided a method for radiographic imaging comprising the steps of:

receiving radiation from a multiplicity of radiation point sources on a sample at an avalanche chamber and providing a multiple photon output indicative of the path of the emitted radiation through the avalanche chamber;

receiving the photon output of the avalanche chamber and providing an image intensified output;

sensing the image intensified output; and carrying out a vector analysis on the information contained in the camera output in order to determine the location of the radiation emitting point source on the sample.

Further in accordance with a preferred embodiment of the invention, the method of carrying out a vector analysis comprises the steps of:

initially scanning an image frame to identify groups of adjacent pixels i,j in which the intensity distribution of the image $V_{i,j}$ is above a given threshold;

storing each such group for further analysis;

for each group, determining the projection of the pathway of the radiation in a plane parallel to the plane of the sample;

determining the direction of the radiation pathway along the projection;

determining the maxima of the image intensity in the plane of the projection;

applying a geometric correction to the location of the maximum to take into account the finite spatial separation between the plane of the projection and the plane of the sample along an axis perpendicular to those planes, to determine the point of origin of the radiation in the sample; and repeating the foregoing steps following the storing steps for each group.

Additionally in accordance with a preferred embodiment of the invention, the method also includes the step of gating in response to the output of at least one of a coincidence or anticoincidence detector.

BRIEF DESCRIPTION OF THE DRAWINGS

The present invention will be understood and appreciated more fully from the following detailed description, taken in conjunction with the drawings in which:

FIG. 3D is a side sectional illustration of an avalanche chamber constructed and operative in accordance with another preferred embodiment of the present invention and including an anti-coincidence detector having an opaque absorber;

FIG. 4C is a three-dimensional illustration of the spatial relationship between the camera information and the point source on a gel sample corresponding to FIG. 4B;

FIG. 4D is a side view illustration corresponding to the illustrations of FIGS. 4B and 4C;

FIGS. 7A and 7B are block diagram illustrations of two alternative embodiments of gating apparatus useful in the apparatus of FIG. 6.

DETAILED DESCRIPTION OF A PREFERRED EMBODIMENT

Figure 1:
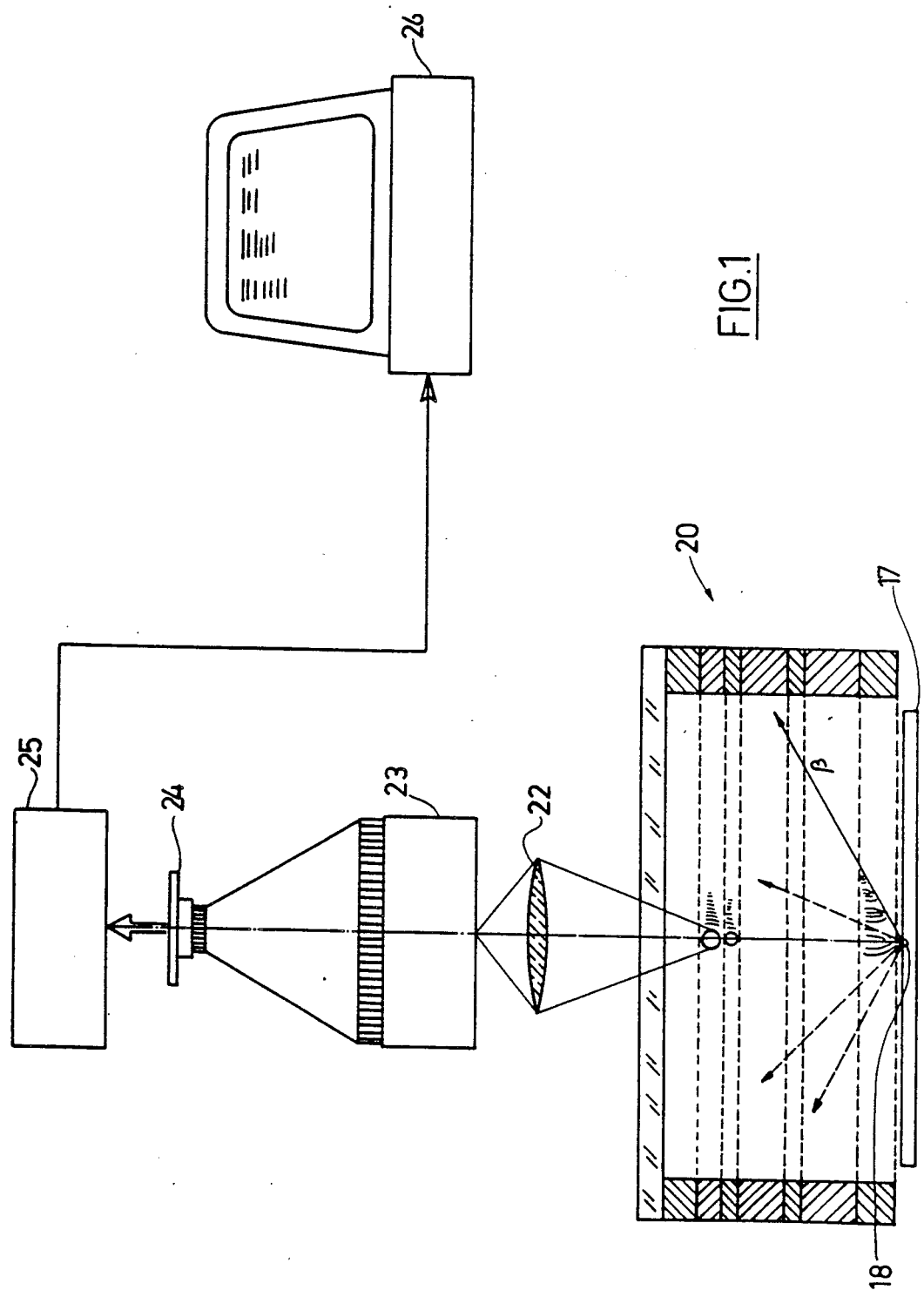
FIG. 1 is a schematic illustration of apparatus for high resolution automatic analysis of radioactive images constructed and operative in accordance with a preferred embodiment of the present invention.
Figure 2:
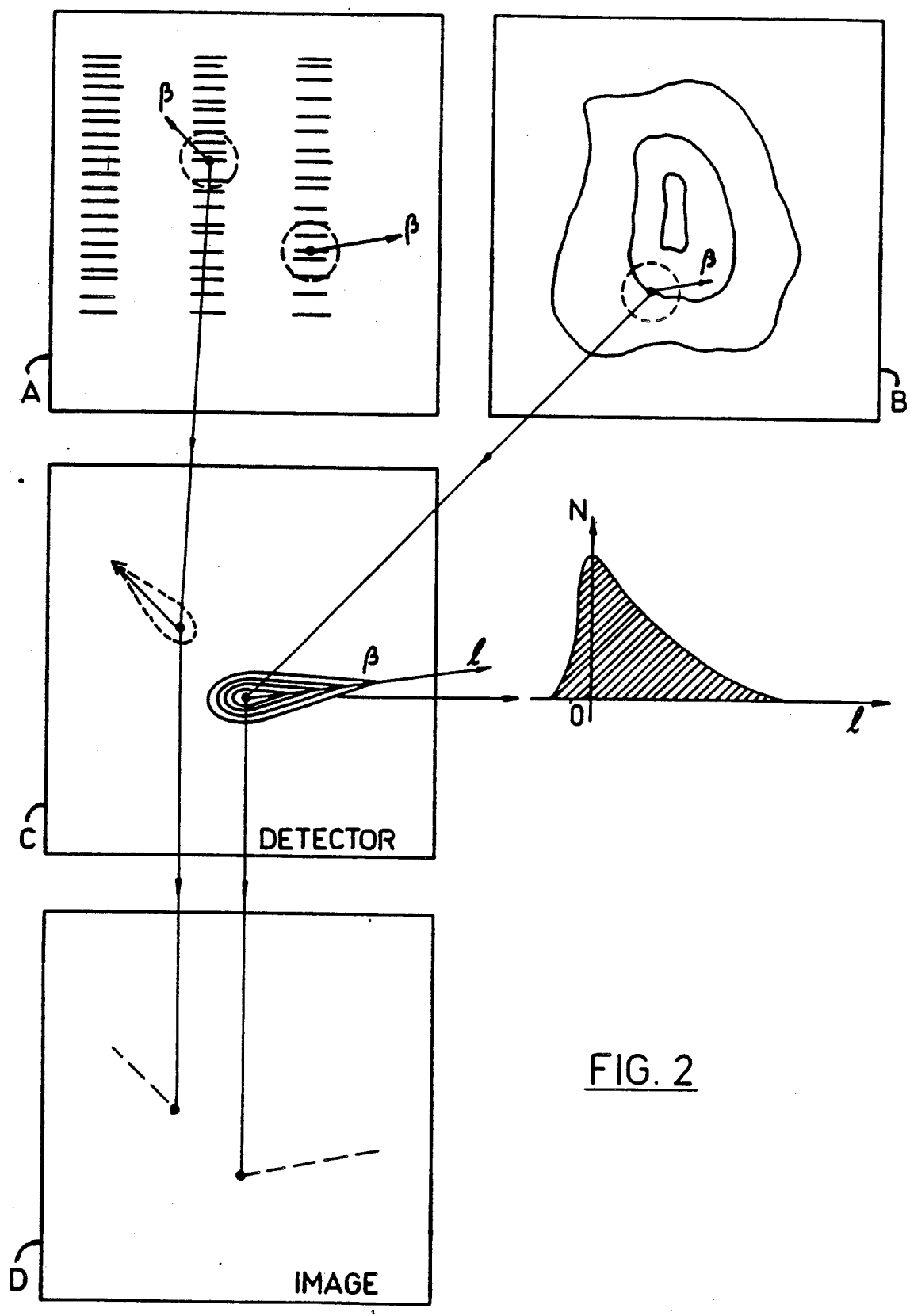
FIG. 2 is a diagrammatic illustration of point source analysis for two different types of samples.
Figure 3A:
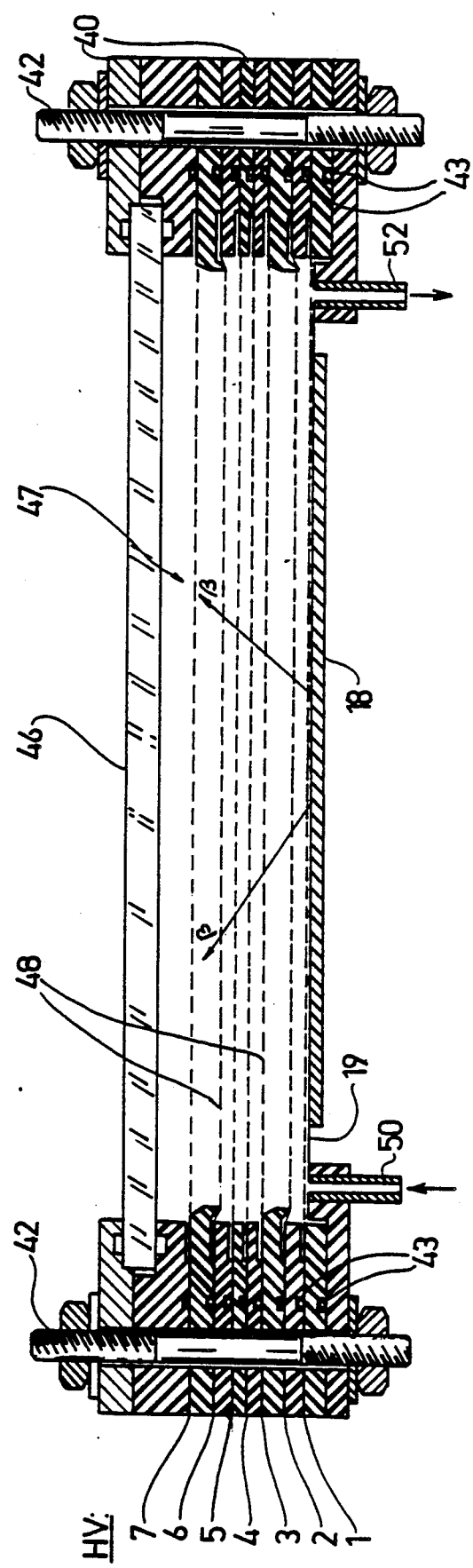
FIG. 3A is a side sectional illustration of an avalanche chamber constructed and operative in accordance with a preferred embodiment of the present invention.

Reference is now made to FIGS. 1 and 3A, which illustrate apparatus for high resolution automatic analysis of radioactive images constructed and operative in accordance with a preferred embodiment of the present invention. The apparatus includes a stationary or movable support 17 onto which a thin sample 18 is placed. The sample is typically a Beta-labeled gel of the type illustrated at A in FIG. 2 or a thin biological sample of the type illustrated at B in FIG. 2.

Beta radiation emitted by the sample 18 passes through a thin window 19 (FIG. 3A), typically formed of Mylar of thickness 0.5-25 microns, into an avalanche chamber 20. In the case of samples which produce very low energy Beta electrons, such as Beta electrons from Tritium, the sample may be placed inside the gas volume of the avalanche chamber. Avalanche chamber 20 is preferably constructed as will be described hereinafter in detail with reference to FIGS. 3A-3D. As it passes through the avalanche chamber 20, the Beta radiation produces a series of avalanches of electrons. By suitable choice of the gas filling avalanche chamber 20, a generally similar amount of photons is produced during the electron avalanche in a pattern which is represented by the concentric patterns seen at reference numeral 21 in FIG. 4C.

The photon emissions from the avalanche chamber 20, produced by the Beta emissions of the sample 18, are collected by a lens 22, such as a Lyman Alpha II, available from the Nye Optical Company of Troy Street, Spring Valley, Calif. 92072, and supplied to an image intensifier 23. A preferred image intensifier is a second generation fast gateable image intensifier such as a Proxitronic BV 2512QX having a 25 mm diameter S20 photocathode, and R 10 phosphor available from Proxitronic of Bensheim, W. Germany.

A CCD camera 24, such as a Thomson 7864OF 288x550 pixels 11 mm diagonal, receives the output of the CCD camera and provides a video output to a frame grabber and digitizer 25, such as a Data Translation DT 2851, available from Data Translation of Marlboro, Mass., U.S.A.

The output of digitizer 25 is supplied to a computer 26 such as a PC/AT.

Reference is now made to FIG. 2, which illustrates graphically the image processing technique employed in accordance with the present invention on two different types of samples, an electrophoresis gel, illustrated at A and a biological sample slice illustrated at B.

A typical Beta emission from each sample is drawn on the illustration of the sample. The photon image seen by the camera 24 of each Beta emission is shown at C and the vector and point source location determined by vector analysis in accordance with a preferred embodiment of the invention is illustrated at D.

Reference is now made to FIG. 3A, which illustrates a preferred embodiment of the avalanche chamber employed in the present invention. The avalanche chamber comprises a plurality of peripheral frame members 40, which are made of an insulating material such as G-50 and are joined together by transverse bolts 42 which compress O-rings 43 to define together with window 19 and an optical window 46 a gas tight enclosure 47.

The gas tight enclosure is divided into a plurality of generally planar regions by a plurality of mesh electrodes 48 of conventional arrangement and construction which are supported between adjacent frame members 40 in generally parallel spaced orientation. The mesh electrodes are preferably formed of wires of stainless steel having a diameter of 50 microns. The wires are preferably spaced from each other (center to center) by 500 microns. The mesh is commercially available from G. Bopp & Co. A. G. of Zurich, Switzerland.

For convenience in future reference, the electrodes are numbered in the illustration from 1 to 7. A gas inlet 50 and gas outlet 52 are defined in association with window 19.

Typically, the enclosure 47 is filled with a gas mixture of about 90% Argon, 5% Propane and 5% Triethylamine.

The avalanche chamber may be operated in a DC mode wherein the voltages of the various mesh electrodes 48 are as follows:

| Electrode # | Voltage (Volts) |
| --- | --- |
| 7 | +5500 |
| 6 | +4500 |
| 5 | +1000 |
| 4 | +600 |
| 3 | +550 |
| 2 | 0 |
| 1 | −4000 |

Alternatively the avalanche chamber may be operated in a gated mode wherein the voltages of the various mesh electrodes 48 are as follows:

| Electrode # | Voltage (Volts) | |
| --- | --- | --- |
| 7 | +5500 | |
| 6 | +4500 | |
| 5 | +1000 | |
| 4 | +550 | +50 (when gated on) |
| 3 | +600 | −50 (when gated on) |
| 2 | 0 | |
| 1 | −4000 | |

Figure 3B:
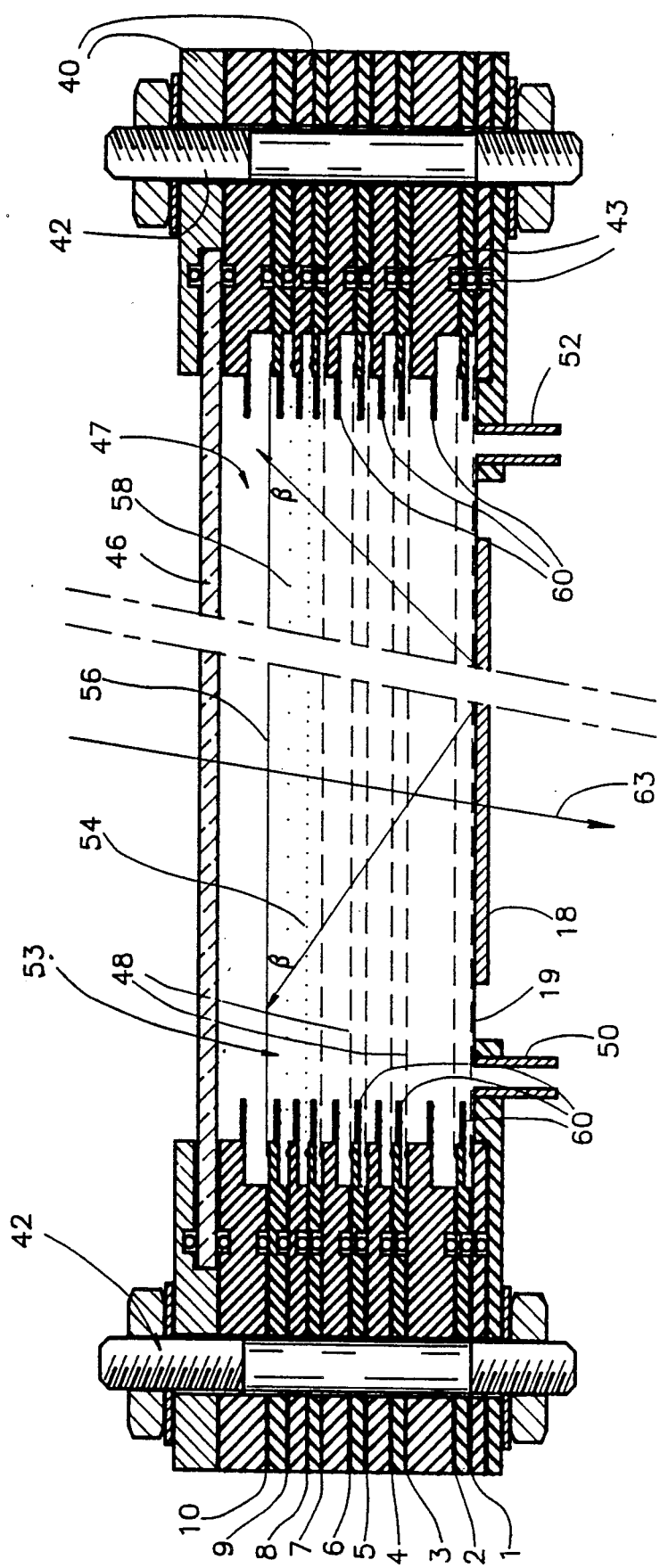
FIG. 3B is a side sectional illustration of an avalanche chamber constructed and operative in accordance with another preferred embodiment of the present invention and including a coincidence detector.
Figure 4A:
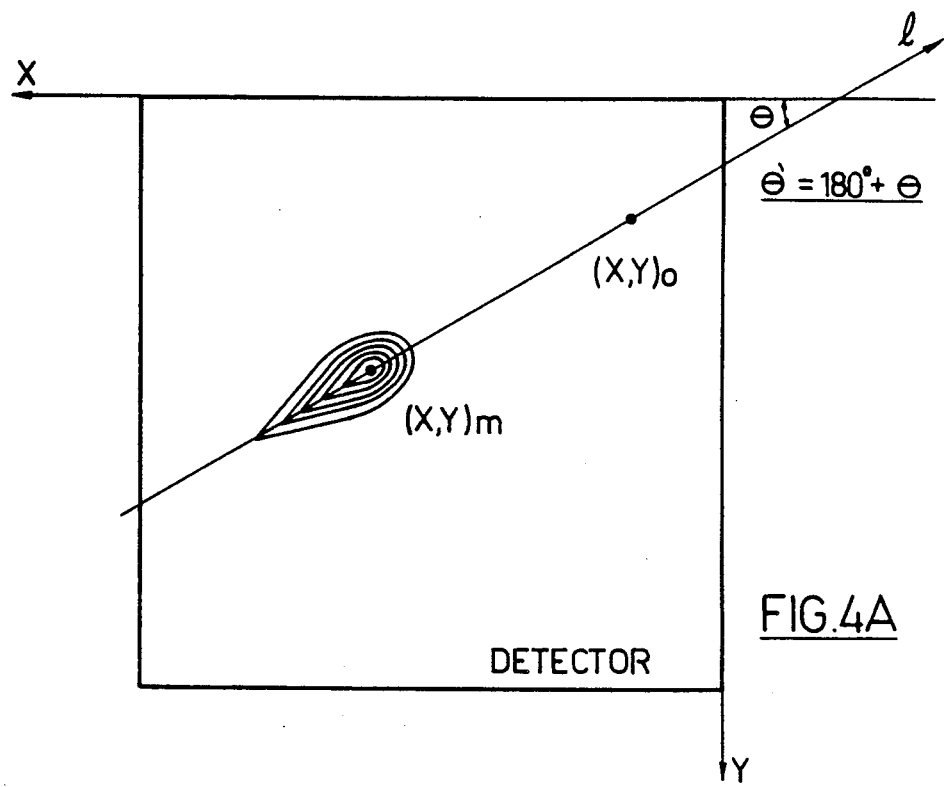
FIGS. 4A and 4B are illustrations of the location of a point source relative to camera output information for radiation traveling in directions which are 180 degrees out of phase.
Figure 4B:
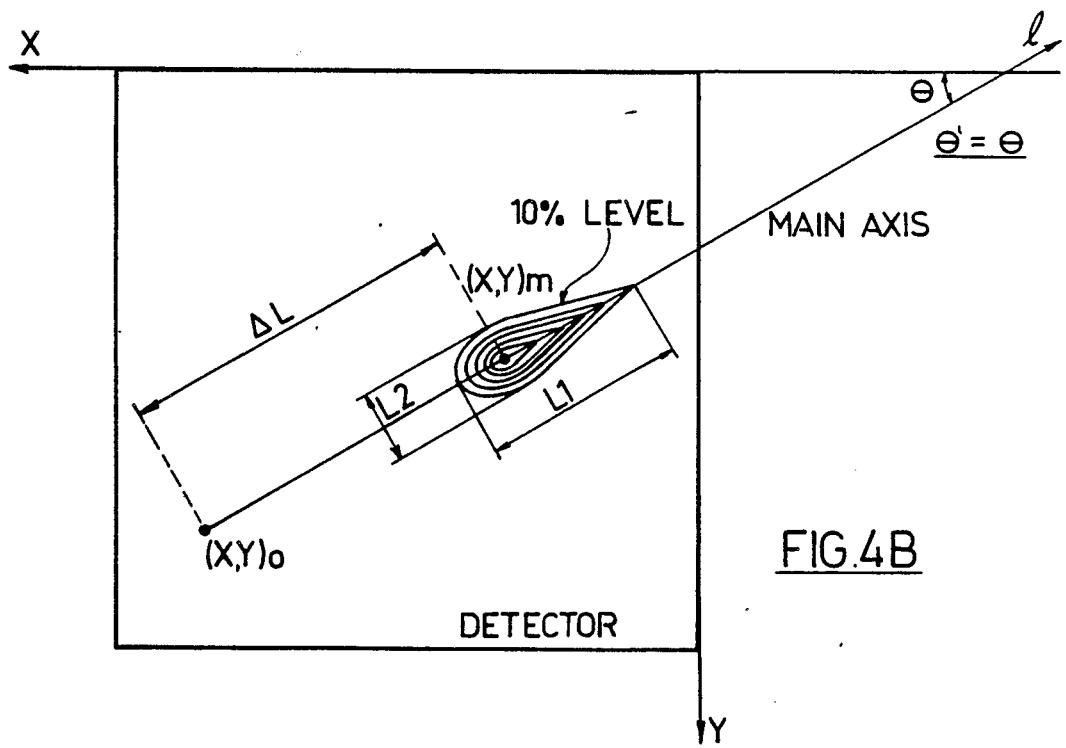

Reference is now made to FIG. 3B, which illustrates an alternative preferred embodiment of avalanche chamber constructed and operative in accordance with the present invention. The avalanche chamber of FIG. 3B is similar to that shown in FIG. 3A, with the following differences:

A coincidence detector 53 is incorporated into the avalanche chamber downstream of the mesh electrode which is identified by index 7. The coincidence detector is preferably in the form of a multi-wire proportional counter and comprises first and second wire cathode planes 54 and 56, the wires of which extend mutually perpendicularly, as shown. The wires are typically of diameter 50 microns and are spaced from each other (center to center) by about 1–2 mm.

The coincidence detector 53 also comprises an anode wire plane 58, formed of relatively thin wires, typically having a 20 micron diameter, which wires are spaced from each other by 5 mm.

The wires employed in the coincidence detector are commercially available from Lumametall AB of Kalmar, Sweden.

The provision of coincidence detector 53 in the avalanche chamber ensures that only Beta particles having a given minimum range are measured, inasmuch as particles, such as spontaneous emission electrons, having a shorter range, do not actuate the coincidence detector 53, which may be used for gating purposes.

The embodiment of FIG. 3B also includes an alternative structure for field shaping at the periphery of the avalanche gaps. This structure comprises thin peripheral extensions 60 of the insulator between each wire plane. This structure provides enhanced shaping of the electric field and thus prevents spontaneous sparking at the periphery.

The voltages on the wire planes 54, 58 and 56 are indicated by indices 8, 9 and 10 and are as follows, when the indices 1–7 are defined as stated hereinabove:

| Electrode # | Voltage (Volts) |
| --- | --- |
| 10 | +4000 |
| 9 | +6000 |
| 8 | +4000 |

Figure 3C:
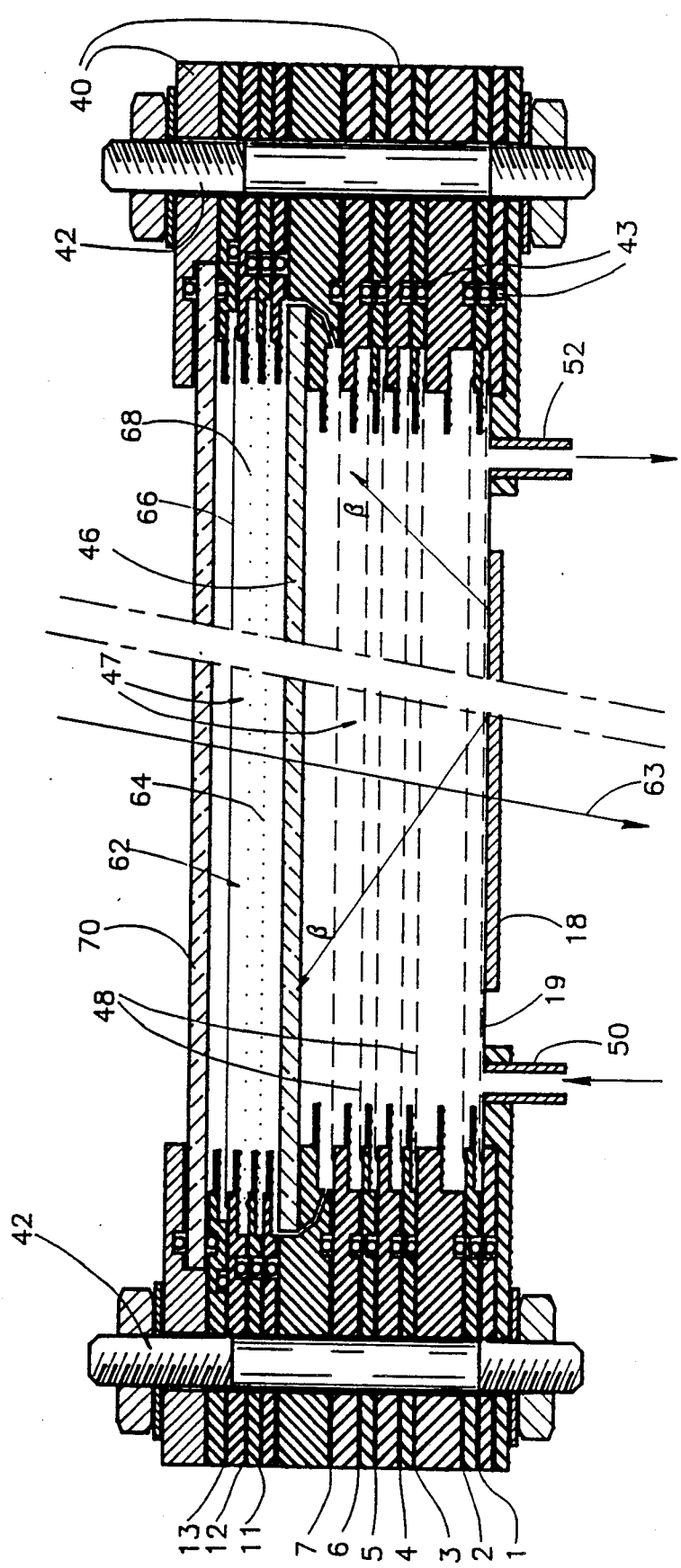
FIG. 3C is a side sectional illustration of an avalanche chamber constructed and operative in accordance with yet another preferred embodiment of the present invention and including an anti-coincidence detector having an optically transparent absorber.

Reference is now made to FIG. 3C which illustrates a further preferred embodiment of the invention wherein an anticoincidence detector 62 is employed. The provision of the anticoincidence detector 62 enables the presence of cosmic radiation 63 to be sensed, inasmuch as only the cosmic particles can enter the anticoincidence detector 62. The detector 62 is employed to gate operation of the detection system, such that cosmic radiation is not detected The anti-coincidence detector 62 is incorporated into the avalanche chamber downstream of window 46 (FIG. 3A). The anti-coincidence detector is preferably in the form of a multiwire proportional counter and comprises first and second wire cathode planes 64 and 66, the wires of which extend mutually perpendicularly, as shown. The anti-coincidence detector 62 also comprises an anode wire plane 68, formed of relatively thin wires, typically having a 20 micron diameter, which wires are spaced from each other by 5 mm, and a transparent outer window 70. The wires of the cathode wire planes 64 and 66 of the embodiment of FIG. 3C typically have a 50 micron diameter, are spaced from each other by 1 mm and are commercially available from Lumametall AB of Kalmar, Sweden.

The provision of anti-coincidence detector 62 in the avalanche chamber ensures that only cosmic particles are detected thereby, such that when detector 62 is used for gating purposes, those particles can be ignored.

The voltages on the wire planes 64, 68 and 66 are indicated by indices 11, 12 and 13 and are as follows, when the indices 1-7 are defined as stated hereinabove:

| Electrode # | Voltage (Volts) |
|---|---|
| 13 | 0 |
| 12 | +2000 |
| 11 | 0 |

Reference is now made to FIG. 3D which illustrates yet another preferred embodiment of the invention wherein an anticoincidence detector 72 is employed at a location upstream of the sample 18 (FIG. 3A). The provision of the anti-coincidence detector 72 enables the presence of cosmic particles to be sensed, inasmuch as only the cosmic particles can enter the anticoincidence detector 72. The detector 72 is employed to gate detection such that cosmic radiation is ignored.

The anti-coincidence detector 72 is preferably in the form of a multi-wire proportional counter and comprises first and second metallic cathode plates 74 and 76. The anticoincidence detector 72 also comprises an anode wire plane 78, formed of relatively thin wires, typically having a 20 micron diameter, which wires are spaced from each other by 5 mm. Preferably the anti-coincidence detector 72 is removably connected to the remainder of the avalanche chamber by means of a quick coupling arrangement, indicated generally by reference number 80, which may include a hinge 82. This arrangement provides ready physical access to the sample 18.

As compared with the embodiment of FIG. 3C, the anticoincidence detector in the embodiment of FIG. 3D does not introduce additional interference between the source 18 and the optical detectors located outside the avalanche chamber The voltages on the planes 74, 78 and 76 are indicated by indices 14, 15 and 16 and are identical to those listed hereinabove for planes 11, 12 and 13 respectively.

Figure 5:
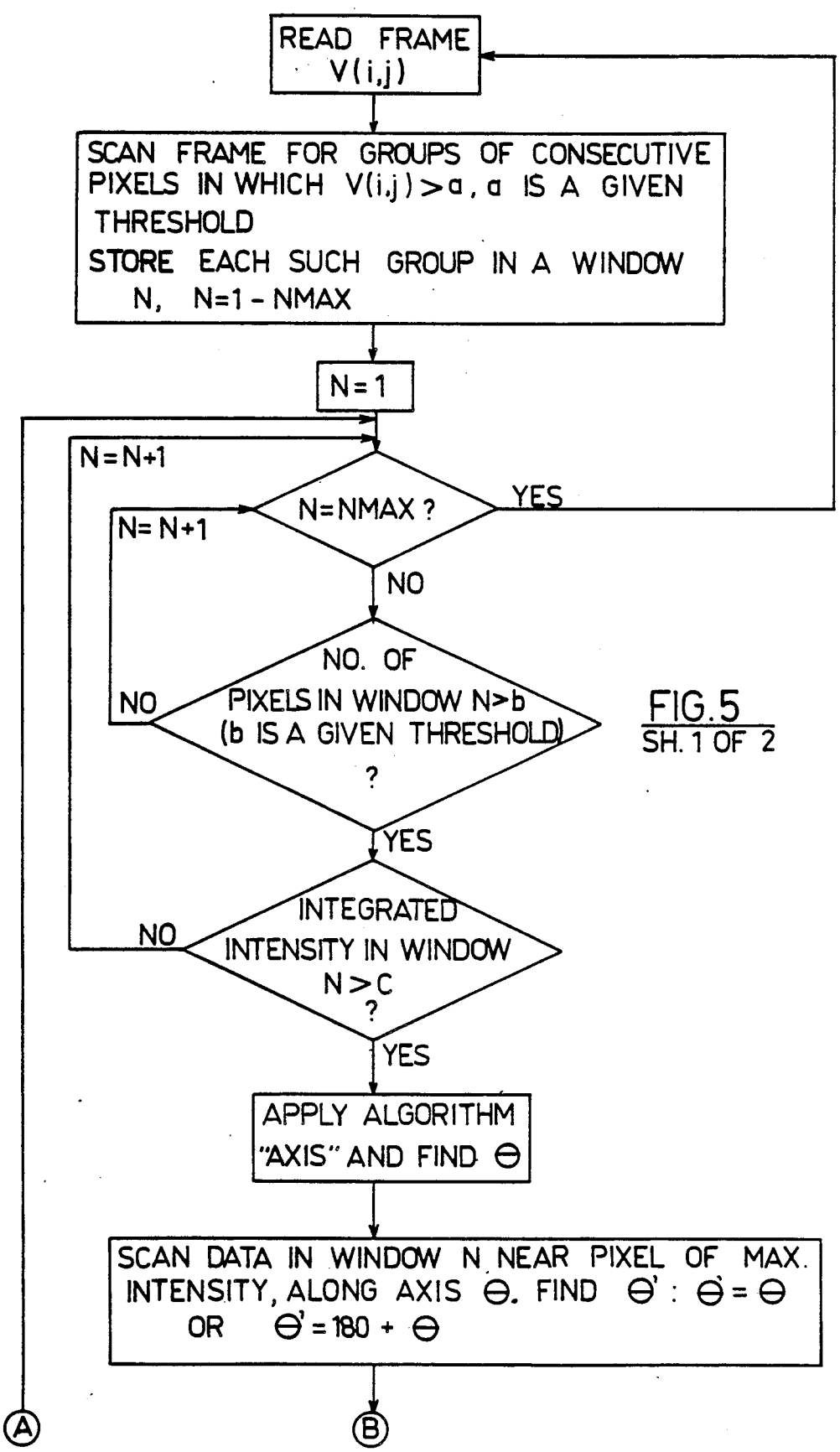
FIG. 5 is a flow chart illustrating operation of the image processing apparatus of the present invention.
Figure 5:
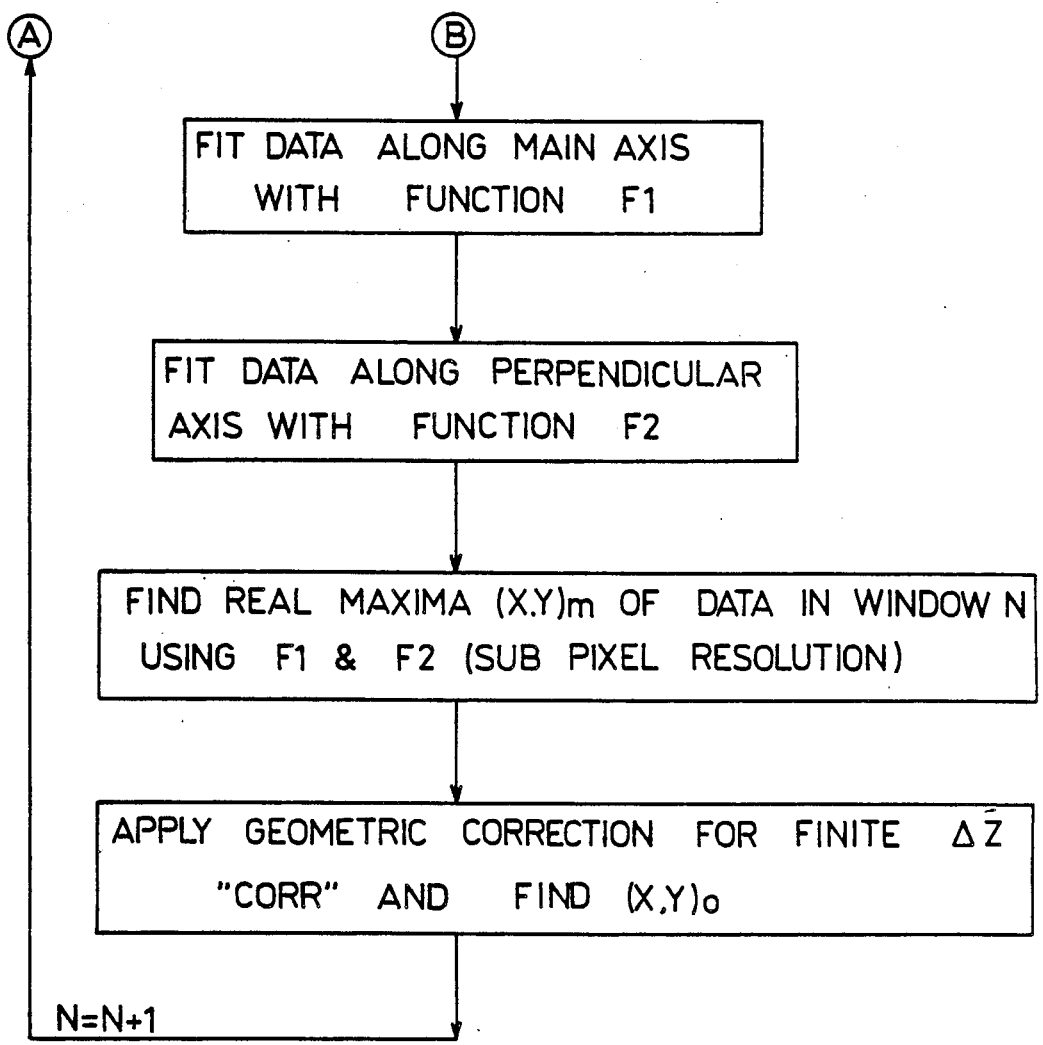

Reference is now made to FIGS. 4A-4D, which illustrate the geometrical relationship between the camera detected images and the point source of the Beta radiation. With reference to these drawings, the mode of operation of the apparatus of the invention will now be described with reference to the flow chart of FIG. 5.

Analysis of the radiographic images takes place in accordance with the present invention by initially scanning an image frame to identify groups of adjacent pixels i,j in which the intensity of the image Vi,j is above a given threshold a. Each such group is stored in a window for further analysis.

For each window, the number of pixels is compared with a threshold. If a sufficient number of pixels is present, the integrated intensity V over the pixels is compared with a threshold. If the integrated intensity is sufficient, an "axis" algorithm is applied to find the angle "θ" shown in FIGS. 4A and 4B. A suitable "AXIS" algorithm is described as follows:

Fast algorithm for finding the principal axes of an object

The purpose of the following algorithm is to provide a fast and reliable computaion of the principal axes of an object seen in a video picture V(x,y) of 32 by 32 pixels. The principal axes are computed by means of the second order moment of inertia of a uniform flat body. The principal axes are defined such taht the cross second moment is zero. The cross second moment results from coupling between the X axis and the Y axis due to rotation about the center of mass. Several simplifying assumptions were made.

1. The internal details of the object are not important.
2. The Signal to Noise Ratio (SNR) is better that 6.
3. There are no other objects in the image besides the target.

Using assumption (1) the method of separating the target from the background and noise can be thresholding.

Using assumption (2) we conclude that collecting the statistics of the noise in the image before the target is present enables setting a threshold level of $3\sigma_N$ to distinguish between background and signal.

Assumption (3) enables the computation of moments of a single body correctly.

Let us define a thresholding function as follows:

$$f(x,y) = \begin{cases} 1, & \text{if } V(x,y) > 3\sigma_N; \\ 0, & \text{otherwise.} \end{cases}$$

When this function outputs value of 1 the coodinates $(x_i, Y_i)$ are transfered to the next stage that computes the moments as explained later on. The value of $V(x_i, Y_i)$ is immaterial from now on as we are sure that it came from a target and the exact internal details of the target are not important.

The high order moments are defined as follows:

$$M_{p,q} = \Sigma x^p y^q f(x,y)$$

f(x,y) insures that only pixels from the target are summed.

The principal axis is defined as a line going through the center of mass having an angle θ with the X axis. Therefore we first calculate the center of mass and, second, calculate the second order moments about the center of mass. The cm subscript will denotes center of mass coordinates and moments.

The needed moments are computed as follows:

$$M_{0,0} = \Sigma x^0 \cdot y^0 \cdot f(x,y) = n$$

$$M_{1,0} = \Sigma x \cdot f(x,y)$$

$$M_{0,1} = \Sigma y \cdot f(x,y)$$

$$M_{1,1,cm} = \Sigma(x - X_{cm}) \cdot (y - Y_{cm}) \cdot f(x,y) = (\Sigma x \cdot y \cdot f(x,y)) - X_{cm} \cdot Y_{cm} \cdot n$$

$$M_{2,0,cm} = \Sigma (x - X_{cm})^2 \cdot f(x,y)(\Sigma x^2 \cdot f(x,y)) - X_{cm}^2 \cdot n$$

$$M_{0,2,cm} = \Sigma (y - Y_{cm})^2 \cdot f(x,y) = (\Sigma y^2 \cdot f(x,y)) - Y_{cm}^2 \cdot n$$

n is the number of pixels in the target.

The moments are used to compute the center of mass coordinates $$X_{cm} = \frac{M_{1,0}}{M_{0,0}}$$

-continued
$$Y_{cm} = \frac{M_{0,1}}{M_{0,0}}$$

The angle $\theta$ of the principal axis is computed as follows:

$$\xi = \tfrac{1}{2} \tan^{-1}\left(\frac{2M_{1,1,cm}}{M_{2,0,cm} - M_{0,2,cm}}\right) = \tfrac{1}{2}\tan^{-1}\left(\frac{A}{B}\right)$$

Considering A and B the following decision table should be used:

$$\theta = \begin{cases} 0°, & \text{if } A = 0 \text{ and } B = 0; \\ 0°, & \text{if } A = 0 \text{ and } B > 0; \\ -90°, & \text{if } A = 0 \text{ and } B < 0; \\ 45°, & \text{if } A > 0 \text{ and } B = 0; \\ -45°, & \text{if } A < 0 \text{ and } B = 0; \\ \xi, & \text{if } A > 0 \text{ and } B > 0; (0° < \theta < 45°) \\ \xi, & \text{if } A < 0 \text{ and } B > 0; (-45° < \theta < 0°) \\ \xi + 90°, & \text{if } A > 0 \text{ and } B < 0; (45° < \theta < 90°) \\ \xi - 90°, & \text{if } A > 0 \text{ and } B < 0; (-90° < \theta < -45°) \end{cases}$$

Note that it is a single pipeline computation of few sums using a decision table at the end of the frame time. With SNR of 6 no more than few noisy pixels will be above threshold. Therefore, to give higher weight over the noise, the whole target was considered and not only the edges or contour. The proposed algorithm is a modified version of an algorithm suggested by Y. Sheng and H. H. Arsenault in "Noisy-image normalization using low-order radial moments of circular-harmonic functions" J. Opt. Soc,. Am. A/Vol. 4 No. 7./July 1987 page 1176–1184.

After determining $\theta$ using the "axis" algorithm, the data in the window near the pixel of maximum intensity is scanned along the axis to determine $\theta'$ which is either equal to $\theta$ or equal to $\theta + 180°$.

Afterwards the intensity data is fitted along the axis using the following truncated exponent function F1:

F1(E) = S × exp[aE] × exp [( E−E )/ E ] × (1+exp[E−E$_0$]/E$_1$])

a, E$_0$, E$_1$ parameters, common for all windows
S free parameter to be found for window N.

Thereafter the intensity data is fitted along an axis perpendicular to the main axis and passing through the pixel of maximum intensity using the following gaussian function F 2:

F2(E) = T × exp[(E−E$_2$)$^2$/$\beta^2$]

E$_2$, $\beta$ parameters, common for all windows
T free parameter to be found for window N.

The real maxima $(x,y)_m$ of the intensity data in window N (FIG. 4A) are then found using functions F 1 and F 2 to subpixel resolution.

A geometric correction is then applied for finite distance delta z of the sample from the detector, as illustrated in FIG. 4C, using the following CORR function, and finding $(x,y)_o$:

tga = d/|L$_1$ − L$_2$|   1.
d = constant

L1, L2 = length of object (10% level) along main axis and perpendicular axis.

X$_0$ = X$_m$ + delta/tga z × Cos$\theta'$

Y$_0$ = Y$_m$ = delta/tga z × Sin$\theta'$   2.

and the point of origin in the sample $(x,y)_o$ is determined for the window.

The process is repeated for each window until all of the points of origin of radiation in the sample are so identified.

Figure 6:
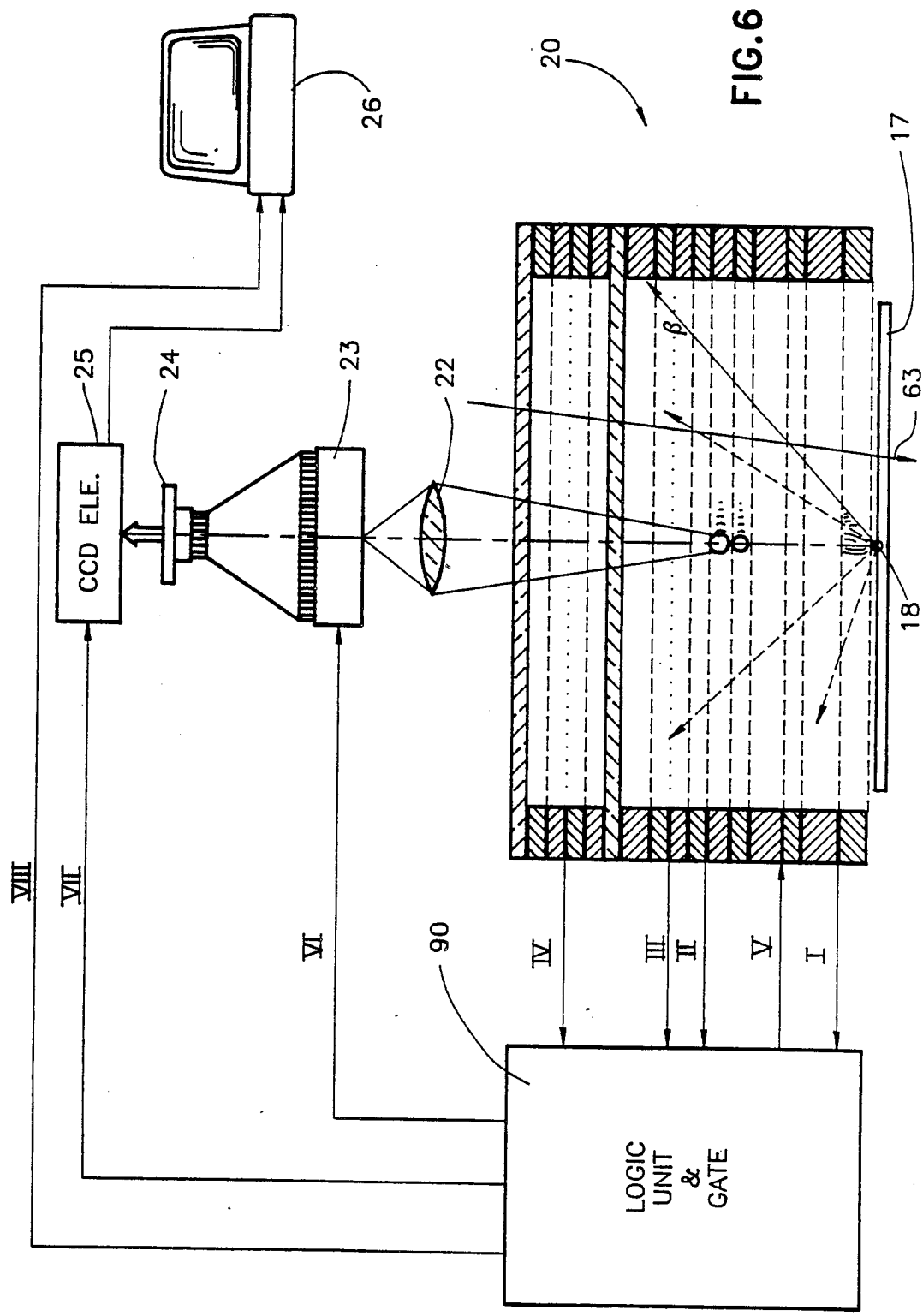
FIG. 6 is a schematic illustration of apparatus for high resolution automatic analysis of radioactive images constructed and operative in accordance with another preferred embodiment of the present invention including coincidence and anti-coincidence detectors and associated gating apparatus.

Reference is now made to FIG. 6, which illustrates apparatus for high resolution automatic analysis of radioactive images constructed and operative in accordance with an alternative preferred embodiment of the present invention. The embodiment of FIG. 6 may be identical to that of FIG. 1 with the addition of both coincidence and anti-coincidence detectors 53 and 62 respectively, of the type described above in connection with FIGS. 3B and 3C respectively.

As seen in FIG. 6, a logic unit and gate circuit 90 receives gating signals I, II, III and IV from the electrodes of the avalanche chamber, indicated by indices 2, 7, 9 and 12 via a suitable DC decoupler. The circuit 90 provides gating outputs to one or more of the following components of the system:

Output V to avalanche chamber gate electrodes identified by indices 3 and/or 4;
Output VI to image intensifier 23;
Output VII to the CCD electronics 25; and
Output VIII to the computer 26.

Reference is now made to FIGS. 7A and 7B, which illustrate two alternative embodiments of the logic unit and gate circuitry 90. In FIG. 7A, it is seen that the logic unit and gate circuitry 90 comprises three amplifiers 92, 94 and 96, such as LeCroy Model TRA 1000, commercially available from LeCroy of Chestnut Ridge, N.Y., U.S.A., which output to three respective discriminators 98, 100 and 102, such as LeCroy Model 623B, which in turn output to three respective delay circuits 104, 106 and 108, such as 50 ohm coaxial cables. The outputs of delay units 104 and 106 are supplied to AND inputs of a logic unit 110, such as a Lecroy Model 465. The output of delay unit 108 is supplied to a NAND input of logic unit 110. The output of logic unit 110 is supplied to a fan out circuit 112, such as a LeCroy Model 430.

One output of fan out circuit 112 is supplied to a gate generator 114, such as a LeCroy Model 222, which activates a gate pulser 116, such as a DEI Model HV 1000, commercially available from DEI of Fort Collins, Colo., U.S.A.. The output of gate pulser 116 is supplied as a square wave output V (FIG. 6) to one or two detector gate electrodes, indicated in FIGS. 3A–3D by indices 3 and 4.

A second output of fan out circuit 112 is supplied via a delay circuit 118, such as a 50 ohm coaxial cable, to a gate generator 120, which may be identical to gate generator 114. The output of gate generator 120 activates a gate pulser 117, identical to gate pulser 116, and is supplied as a square wave output VI (FIG. 6) to the image intensifier 23, for opening the image intensifier which is normally closed.

A third output of fan out circuit 112 is supplied via a delay circuit 122 as outputs VII and VIII to frame grabber/digitizer 25 and computer 26 (FIG. 6).

Reference is now made to FIG. 7B, which illustrates an alternative embodiment of logic unit and gate circuit 90. Here, it is seen that the logic unit and gate circuitry 90 comprises three amplifiers 132, 134 and 136, such as LeCroy Model TRA 1000, which output to three respective discriminators 138, 140 and 142, such as LeCroy Model 623B, which in turn output to three respective delay circuits 144, 146 and 148, such as 50 ohm coaxial cables. The outputs of delay units 144 and 146 are supplied to AND inputs of a logic unit 150, such as a Lecroy Model 465. The output of delay unit 148 is supplied to a NAND input of logic unit 150. The output of logic unit 150 is supplied to a fan out circuit 152, such as a LeCroy Model 430.

One output of fan out circuit 152 is supplied via a delay unit 153 to a gate generator 154, such as a LeCroy Model 222. The output of gate generator 154 activates a gate pulser 119, identical to gate pulser 116, which supplies a square wave output VI (FIG. 6) to the image intensifier 23, for opening the image intensifier which is normally closed.

A second output of fan out circuit 152 is supplied via a delay circuit 162 as outputs VII and VIII to frame grabber/digitizer 25 and computer 26 (FIG. 6).

It will be appreciated by persons skilled in the art that the present invention is not limited by what has been particularly shown and described hereinabove. Rather the scope of the present invention is defined only by the claims which follow:

We claim:

1. Apparatus for radiographic imaging comprising:
a multistage avalanche chamber receiving radiation from a multiplicity of radiation point sources on a sample and providing a multiple photon output indicative of the path of the emitted radiation through the avalanche chamber;
image intensification means receiving the photon output of the avalanche chamber;
a camera receiving an output from the image intensification means; and
image processing means for receiving the camera output and carrying out a vector analysis on the information contained in the camera output in order to determine the location of the radiation emitting point source on the sample.

2. Apparatus according to claim 1 and wherein said camera comprises a CCD camera.

3. Apparatus according to claim 1 or claim 2 and wherein said avalanche chamber comprises a plurality of gas-filled regions separated from each other by wire grids and including a preamplification region, a charge amplification region, and a light amplification region.

4. Apparatus according to claim 3 and wherein said avalanche chamber also includes a gate region.

5. Apparatus according to claim 1 or 2 and wherein said image processing means includes frame grabber circuitry.

6. Apparatus according to claim 1 or 2 and wherein said avalanche chamber also includes a coincidence detector and means for gating in response to the output thereof.

7. Apparatus according to claim 1 or 2 and wherein said avalanche chamber also includes an anti-coincidence detector and means for gating in response to the output thereof.

8. Apparatus according to claim 7 and wherein said anticoincidence detector is associated with an optically transparent window.

9. Apparatus according to claim 7 and wherein said anticoincidence detector is associated with a opaque window.

10. A method for radiographic imaging comprising the steps of:
receiving radiation from a multiplicity of radiation point sources on a sample at an avalanche chamber and providing a multiple photon output indicative of the path of the emitted radiation through the avalanche chamber;
receiving the photon output of the avalanche chamber and providing an image intensified output;
sensing the image intensified output; and
carrying out a vector analysis on the information contained in the camera output in order to determine the location of the radiation emitting point source on the sample.

11. A method according to claim 10 and wherein said step of carrying out a vector analysis comprises the steps of:
initially scanning an image frame to identify groups of adjacent pixels i,j in which the intensity distribution of the image $V_{i,j}$ is above a given threshold;
storing each such group for further analysis;
for each group, determining the projection of the pathway of the radiation in a plane parallel to the plane of the sample;
determining the direction of the radiation pathway along the projection;
determining the maxima of the image intensity in the plane of the projection;
applying a geometric correction to the location of the maximum to take into account the finite spatial separation between the plane of the projection and the plane of the sample along an axis perpendicular to those planes, to determine the point of origin of the radiation in the sample; and
repeating the foregoing steps following the storing steps for each group.

12. A method according to either of claims 10 and 11 and also comprising the step of gating using the output of at least one of a coincidence or anti-coincidence detector.

* * * * *